United States Patent [19]

Dethlefs et al.

[11] Patent Number: 4,935,298

[45] Date of Patent: Jun. 19, 1990

[54] WATER-RESISTANT SUPPORT MATERIAL FOR LIGHT-SENSITIVE MATERIALS

[75] Inventors: Ralf-Burkhard Dethlefs, Bissendorf; Bernd Scholz, Osnabrück; Wolfram Wysk, Belm, all of Fed. Rep. of Germany

[73] Assignee: Felix Schoeller jr GmbH & Co. KG, Osnabrück, Fed. Rep. of Germany

[21] Appl. No.: 185,869

[22] Filed: Apr. 25, 1988

[30] Foreign Application Priority Data

May 15, 1987 [DE] Fed. Rep. of Germany ....... 3716269

[51] Int. Cl.$^5$ .................. B82B 5/16; B82B 27/10; G03C 1/86
[52] U.S. Cl. .................................. 428/323; 428/511; 428/516; 428/513; 264/176.1; 430/538; 524/570; 524/579
[58] Field of Search ............... 428/516, 323, 511, 513

[56] References Cited

U.S. PATENT DOCUMENTS 4,584,234 4/1986 Hirose .............................. 428/516
4,650,747 3/1987 Uno et al. .......................... 430/536

Primary Examiner—P. C. Ives
Attorney, Agent, or Firm—Horst M. Kasper

[57] ABSTRACT

A water-resistant support material for light-sensitive materials is disclosed, which is coated on one side or two sides with a polyolefin resin. At least the polyolefin resin of the front-side coating is a copolymer of ethylene and a non-ethylene α-olefin. This copolymer allows to add to the coating mass a high content in light-reflecting white pigment.

10 Claims, No Drawings

WATER-RESISTANT SUPPORT MATERIAL FOR LIGHT-SENSITIVE MATERIALS

BACKGROUND OF THE INVENTION

1. Field of the Invention

The invention relates to a photographic support material with a water-resistant coating of a polyolefin resin.

2. Brief Description of the Background of the Invention Including Prior Art

Water-resistant photographic support materials comprise a plastic film or a base paper with synthetic resin coatings applied to preferably both sides, which include polymers, for example polyethylene, and which are applied by way of extrusion coating or which comprise an organic lacquer mixture, which is placed on the paper by way of a submersion or spray method and which is dried and hardened or solidified by employing heat or energy-rich radiation.

One or several silver halides containing light-sensitive layers are applied on one of the resin layers. In case of light-sensitive layers, it can refer to both black and white as well as color photographic layers.

The synthetic resin layer (front-side coating) disposed under the light-sensitive layer or, respectively, layers comprises usually a light-reflecting white pigment as well as possibly color pigments, optical brighteners and/or other additives such as antistatic agents, dispersion additives for the white pigment, antioxidants, separating agents, and the like.

The synthetic resin layer, disposed on the paper side opposite to that of the one with the light-sensitive layers (back-side coating), can be pigmented or can be left unpigmented and/or can contain other additives, which result from the use of the laminate as a photographic support material in each case and which, in principle, can correspond to those of the front-side coating.

The front-side coating can contain additional function layers which improve, for example, the adhesion of the light-sensitive layers.

In addition, the back-side coating can be provided with additional function layers which can improve, for example, the capability of writing on the material, the antistatic property, the slip properties, the flatness (planarity), or several of these properties.

In order to achieve that a resin coated photographic paper support, after a one-side application of photographic layers, does not exhibit an undesirable curvature (curl), it is usually provided that the front-side polyethylene layer comprises substantially a low-density polyethylene (LDPE), whereas the back-side polyethylene layer predominantly comprises a high-density polyethylene (HDPE), compare German Patent Application Laid Open DE-OS No. 2,028,600.

The coating of a photographic base paper or of a film material with polyolefin coating by way of extrusion via a slot die is a method known in the art. It is also known that, during the extrusion of the polyethylene, certain difficulties occur, which can result, owing to the high sensitivity of the photographic process, in perceivable disturbances in photographic layers or even in a uselessness of the support material.

The use of low-density polyethylenes (LDPE), produced by polymerizing ethylene according to the high-pressure method, transfers the disadvantages of insufficient stiffness and hardness of this polyethylene to the photographic paper support, which can be noticed by an insufficient overall stiffness of the final product and, in particular, in case of glossy surfaces, by an increased tendency to sticking in the wound roll.

However, also the use of polyethylene of higher density (HPDE), produced by polymerization of ethylene according the low-pressure method, transfers to the photographic-paper support material disadvantages which are generated by the higher melt viscosity and the crystallinity of the high-density polyethylene or result from the additives added to this polyethylene necessary for purposes of stabilization, if this polyethylene is employed in a front-side coating. These disadvantages include a weak and insufficient adhesion on the paper support and an unsatisfactory planarity of the coated paper. In addition, the low "draw-down" of the high-density polyethylene can be a disadvantage, in particular where thinner coatings are desired.

In order to limit the disadvantages associated with the individual polyethylene types, optimized mixtures of low-density polyethylene and high-density polyethylene are usually employed, (e.g. U.S. Pat. No. 4,699,874).

It is a joint property of the two polyethylene types and of their mixtures that they can only be filled to a limited extent with pigments. It is taught in German Patent Application Laid Open DE-OS No. 3,411,681 (English language equivalent=GB No. 21 389 64) how much the sharpness of a photographic image depends on the extent of reflection of the impinging light off the white pigments. Therefore, it is an important goal of all light-sensitive support materials to improve this reflection of the impinging light. This is achieved by employing white pigments with the highest indices of refraction, such as titanium dioxide, and by maintaining as high as possible the content in white pigment in the polyolefin resin with a very good dispersion such that a dense pigment packing is generated and present in the support near the surface. It has to be avoided in this context to generate pigment agglomerates in the polyolefin resin, since they decrease on the one hand the total light reflection and, on the other hand, they can result in disturbances and interferences during the drawing of the melt film in the extrusion coating, or later during the casting of the resin coated support with light-sensitive emulsions.

In practice of extrusion coating, the pigment concentration in a polyethylene resin coating mixture has been limited hitherto to less than 20 weight-percent and is usually between 10 and 17 weight-percent. This holds both for a pure low-density polyethylene as well as for the described mixtures of low-density polyethylene and high-density polyethylene.

The various problems associated with all photographic paper support materials coated with polyethylene have resulted in further specific developments. Such developments are for example described in the German Patent Application P No. 3,627,859.9. According to that patent application, the sum of the associated disadvantages is clearly improved on in several aspects. However, the results are not satisfactory in that the titanium-dioxide concentration is limited to about 20 percent and that the number of the pigment agglomerates is only slightly decreased.

SUMMARY OF THE INVENTION

1. Purposes of the Invention

It is an object of the present invention to provide a photographic support material coated with a polyolefin resin, which accepts an increased filling degree with pigments and results in a lower number of pigment agglomerates upon use of titanium-dioxide pigment in the front-side coating.

It is another object of the present invention to provide a coating mixture which allows to produce a photographic support material with an improved front-side coating containing a higher pigment-filling degree and a lower number of pigment agglomerates.

It is yet another object of the present invention to provide a support material coated with polyolefin resin which exhibits an increased light-reflection.

These and other objects and advantages of the present invention will become evident from the description which follows.

2. Brief Description of the Invention

A water-resistant support material for light-sensitive layers comprises a substantially flat two-dimensional base material. Polyolefin resin is coated onto a front side of the base material for forming a coating. The coating comprises in addition a light-reflecting white pigment on the face of the base material (e.g. paper or film) to be coated with light-sensitive layers. The polyolefin resin on the front side contains a so-called linear low density polyethylene (LLDPE), a copolymer of ethylene and non-ethylene α-olefin. The α-olefins are unsaturated aliphatic hydrocarbons having a double bond next to a terminal carbon atom. Such LLDPE linear low density polyethylenes are known and for example taught in the article πA study of linear low-density polyethylenes: branch content, branch distribution and crystallinity by C. France et al. in Polymer, 1987, Vol 28, April, pages 710–712.

Polyolefin resin can further be coated onto the opposite side of the base material for forming a coating. This back-side coating can comprise any type of polyolefin. A prefered combination is a mixture of HDPE and LDPE, but inclusion of LLDPE is possible.

The base material can be provided by any photographic base paper or by any film base.

The base material can be a natural or synthetic paper material or a film material.

The light-reflecting white pigment in the front-side coating can be a titanium dioxide. The content of titanium dioxide in the coating material can amount up to 40 weight-percent. The coating mass can comprise at least one of the conventional additives selected from the group consisting of matting agents, antistatics, antioxidants, slip additives, lubricants, pigments, coloring agents, optical brighteners, and separating agents.

The so-called LLDPE is a copolymer consisting or comprising of ethylene and a non-ethylene with a chainlength of 3–18 carbon atoms and preferably 4 to 8 carbon atoms. The content of non-ethylene α-olefin in the copolymer can range to from about 0.1 to 20 mole-percent.

Furthermore a premixture composition is disclosed for the production of water-resistant support materials, comprising polyolefin resin and light-reflecting white pigment. The polyolefin component in the premixture is a copolymer of ethylene and non-ethylene α-olefin, a so-called linear low-density polyethylene, LLDPE. The light-reflecting white pigment is intimately mixed with the said polyolefin resin. The light-reflecting white pigment preferably is titanium dioxide. The content of titanium oxide in the composition can range from about 10 to 70 weight-percent. Additional additives can be selected from the group consisting of coloring agents, pigments, optical brighteners, matting agents, dispersing agents, slip additives, lubricants, separating agents, antistatic agents, antioxidants, and mixtures thereof.

The contents of LLDPE in the premixture composition can range from about 10 weight-percent to 100 weight-percent of the complete polyolefin resin. The non-ethylene α-olefin in the copolymer can comprise $C_3$ to $C_{18}$ carbon atoms and has preferably $C_4$ to $C_8$ carbon atoms. The content of non-ethylene α-olefin in the copolymer can range from about 0.1 to 20 mole-percent.

A method for production of a water-resistant support material can comprise melt-extruding a water-resistant resin coating material onto a base material. The front-side resin coating material contains white pigment and a copolymer of ethylene and non-ethylene α-olefin, which copolymer is a so-called linear low-density polyethylene, LLDPE.

A base material of paper or film can be coated with the water-resistant resin coating material. The light-reflecting white pigment can be titanium dioxide. The content of light-reflecting white pigment, e.g. titanium dioxide, in the coating material can amount up to 40 weight-percent. Light-sensitive coatings can be applied on the pigment-containing resin layer.

According to the invention, the front-side coating comprises a copolymer of ethylene and at least one other α-olefin. Such copolymers are known in principle as so-called linear low-density polyethylene, LLDPE types, and can be produced according to the low-pressure method as well as the high-pressure method.

These so-called linear low-density polyethylenes (LLDPE) have, depending on the kind and content in comonomers, a density of 0.880 to 0.960 g/cm$^3$. The use of these modified polyethylenes with stereospecific molecular structure allows a complete series of improvements. For example, linear low-density polyethylenes exhibit a higher stiffness and crystallinity than the low-density polyethylene and they resemble, with respect to their molecular structure, more to the high-density polyethylene. In addition, the puncture resistance properties as well as the abrasion strength are improved (Plastverarbeiter 33 (1982), 9, pp. 1035–1037, as well as Kunststoffe 73 (1983), 5, pp. 251–254).

However, it was surprisingly found that the addition of linear low-density polyethylene (LLDPE) to the coating mass, which comprises substantially polyolefin resin and titanium dioxide, allows a substantially increased pigment filling and that this pigment filling exhibited even a lesser part in pigment agglomerates. It was further unexpected that there was obtained a stronger adhesion of the coating material according to the present invention to the base paper as compared with a coating material without linear low-density polyethylene under the same conditions.

In particular, the content in pigment agglomerates could be decreased, where the titanium dioxide was processed initially with a linear low-density polyethylene (LLDPE) in a premixture composition with a kneader or a granulating extruder. Such premixtures, where the titanium-dioxide content can amount up to 70 weight-percent, thus represent a particular embodiment of the invention. They can be added with other components to form the corresponding coating materials.

It was further surprising that even highly filled polyolefin-resin melts, containing more than 15 weight-percent titanium dioxide, can be extruded with a predetermined wide-slot die to thinner coating thicknesses than in cases where solely low-density polyethylene, high-density polyethylene, or mixtures of the two were employed. This is advantageous in connection with the higher capability of filling of such polyethylene mixtures because it is thereby possible to apply thinner polyethylene layers on the front side without decreasing the reflection properties. In addition, the back-side coating can be reduced in its thickness where a thinner front-side coating is applied. Lower layer thicknesses allow, however, in case of a predetermined overall thickness of the coated paper, to employ a larger thickness of the paper base, which can be noticed in a marked and desired increase in the stiffness of the final product as well as in lower production costs. Preferably the extrusion coating is furnished with a slot die, a flat sheet die or a T-die, which has been taught early in U.S. Pat. No. 3,411,908.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawing.

DESCRIPTION OF INVENTION AND PREFERRED EMBODIMENT

Example 1

A photographic base paper having a basis weight of 175 g/sq.m was subjected to a Corona pretreatment and than coated on the back-side with 25 g/sq.m of the following mixture:
70 weight-percent high-density polyethylene, $\rho=0.950$ g/cm$^3$
30 weight-percent low-density polyethylene, $\rho=0.924$ g/cm$^3$ Immediately thereafter, the front-side was Corona-pretreated and coated with 30 g/sq.m of the following mixtures:

|   | low density polyethylene density = 0.924 g/cm$^3$ | linear low-density polyethylene density = 0.935 g/cm$^3$ polymerized with 1.0 1.0 mol-percent octene | Premixture A | Premixture B |
|---|---|---|---|---|
| a | 64 | 0 | 36 | 0 |
| b | 64 | 0 | 20 | 16 |
| c | 57.5 | 6.5 | 0 | 36 |
| d | 24.5 | 39.5 | 0 | 36 |

Premixture

A=
50 weight-percent titanium dioxide, containing 97.5% rutile and stabilized with Al$_2$O$_3$;
50 weight-percent low density polyethylene having a density of 0.924 g/cm$^3$.

B=
50 weight-percent titanium dioxide, containing 97.5% rutile and stabilized with Al$_2$O$_3$;
50 weight-percent linear low-density polyethylene having a density of 0.935 g/cm$^3$, with 1 mole-percent octene.

The premixtures were produced in a granulating extruder at 130° C.

The coatings were performed with a tandem-extrusion-coating plant at 310° C. melting temperature and 120 m/min machine speed on a band width of 120 cm. Tandem extrusion plants have found wide distribution and their principle of operation is described for example in U.S. Pat. No. 4,209,584.

Example 2

The photographic base paper used in Example 1 was coated on the back side according to the coating procedure of Example 1.

Then a front-side Corona treatment was performed and immediately thereafter the front side was coated with 30 g/sq.m of the following mixtures:

|   | Mixture of 70 weight-percent low-density polyethylene density = 0.924 g/cm$^3$ 30 weight-percent high-density polyethylene density = 0.950 g/cm$^3$ | Linear low-density polyethylene density = 0.915 g/cm$^3$ polymerized with 3.1 mole percent butene | Premixture A | Premixture C |
|---|---|---|---|---|
| a | 70 | 0 | 30 | — |
| b | 52 | 0 | 48 | — |
| c | 54 | 16 | — | 30 |
| d | 44 | 8 | — | 48 |
| e | 34 | 0 | — | 66 |
| f | 45 | 25 | 30 | — |

Premixture

C=
50 weight-percent titanium dioxide, containing 97.5% rutile and stabilized with Al$_2$O$_3$
30 weight-percent linear low-density polyethylene with a density of 0.915 g/cm$^3$ with 3.1 mole-percent butene
20 weight-percent low-density polyethylene with a density of 0.924 g/cm$^3$ The premixture was produced with a laboratory melt extruder at 300° C. melting temperature and a machine speed of 20 m/min on a 25-cm band width and pelletized.

Example 3

A photographic base paper having a basis weight of 200 g/sq.m was subjected to a Corona pretreatment and then coated on the back side with 15 g/sq.m. of the following mixture:
60 weight-percent low-density polyethylene with a density of 0.924 g/cm$^3$
40 weight-percent linear low-density polyethylene with a density of 0.935 g/cm$^3$ polymerized with 1.0 mole-percent octene Immediately following to a Corona pretreatment, the front side was coated according to the following table:

|   | Application g/sq. m | Low-density polyethylene density = 0.924 g/cm$^3$ | Premixture D | Premixture E |
|---|---|---|---|---|
| a | 15 | 64 | 36 | — |
| b | 12.5 | 64 | 36 | — |
| c | 10 | 64 | 36 | — |
| d | 15 | 64 | — | 36 |
| e | 12.5 | 64 | — | 36 |
| f | 10 | 64 | — | 36 |

The premixtures had the following composition:

D =
- 50 weight-percent low-density polyethylene having a density of 0.924 g/cm$^3$
- 48.5 weight-percent titanium dioxide, containing 97.5% rutile and stabilized with $Al_2O_3$
- 0.5 weight-percent ultramarine blue
- 0.6 weight-percent antioxidant (Tinuvin 770)
- 0.2 weight-percent metal stearate
- 0.2 weight-percent cobalt violet E =
- 50 weight-percent linear low-density polyethylene having a density of 0.920 g/cm$^3$ with 3.2 mole-percent octene
- 48.5 weight-percent titanium dioxide containing 97.5% rutile and stabilized with $Al_2O_3$
- 0.5 weight-percent ultramarine blue
- 0.6 weight-percent antioxidant (Tinuvin 770)
- 0.2 weight-percent metal stearate
- 0.2 weight-percent cobalt violet.

The premixtures were produced at 130° C. in a granulating extruder.

All coatings were performed with a tandem-extrusion-coating plant at 310° C. melting temperature and 150 m/min machine speed on a material band width of 120 cm.

Example 4

The photographic base paper of Example 1 was coated on the back side as set forth in Example 1.

Immediately thereafter a Corona pretreatment was performed and the front-side was coated with 30 g/sq.m of the following coating mixture:

|   | low-density polyethylene density = 0.924 g/cm$^3$ (weight-percent) | Premixture consisting of 50 weight-percent titanium dioxide containing rutile as set forth in Examples 1–3 50 weight-percent linear low-density polyethylene of the following kind (weight-percent) |
|---|---|---|
| a | 60 | 40 linear low-density polyethylene with 14.2 mole-percent propene-(1) |
| b | 60 | 40 linear low-density polyethylene with 8.7 mole-percent butene-(1) |
| c | 60 | 40 linear low-density polyethylene with 3.2 mol-percent butene-(1) |
| d | 60 | 40 linear low-density polyethylene with 5.6 mole-percent 4-methyl-pentene-(1) |
| e | 60 | 40 linear low-density polyethylene with 4.2 mole-percent octene-(1) |
| f | 60 | 40 linear low-density polyethylene with 1.0 mol-percent octene-(1) |
| g | 60 | 40 linear low-density polyethylene with 0.2 mole-percent hexadecene-(1) |
| h | 60 | 40 low-density polyethylene for comparison, premixture A |

The premixtures were produced in a granulating extruder at 130° C. The coatings were performed with a melt extruder at 300° C. melting temperature and 20 m/min machine speed on a band width of 25 cm.

DESCRIPTION OF THE TEST METHODS

Filtratest 200 g premixture of 50 weight-percent titanium dioxide and 50 weight-percent polyolefin resin were passed in laboratory extruder at a melting temperature of 300° C. through a preweighed sieve of a mesh width of 25 μm. Thereafter a pure polyolefin resin was extruded through the same sieve until all pigment-containing material had passed the sieve. After calcining of the sieve at 800° C., the residue on the sieve was determined gravimetrically and was recalculated to milligrams of residue per 1 kilogram of titanium dioxide.

Level of Gel Particles

In a transmitting light, the pigment agglomerates were counted in an area of 1 sq.m. of the coated paper, which pigment agglomerates could be recognized on an illuminating table as dark dots. This number is given as specks per square meter.

Adhesion of the Film

The adhesion of the polyolefin resin film on the front side of the base paper is determined by a pulling off of a 10 mm wide strip in machine direction of the coating.

Grades from 1 to 5 were applied, where the grade 1 denotes a very good adhesion and grade 5 denotes no adhesion.

Test Results

TABLE 1

| Premixture | Mixture Titanium Dioxide (TiO$_2$) with | Filtrate test mg residue/kg TiO$_2$ |
|---|---|---|
| A | low-density polyethylene density = 0.924 g/cm$^3$ | 87 |
| B | linear low-density polyethylene (1.0 mole-percent octene-(1)) | 24 |
| C | low-density polyethylene:linear low-density polyethylene (3. mole-percent butene-(1)) 3:2 | 52 |
| D | low-density polyethylene density = 0.924 g/cm$^3$ | 93 |
| E | linear low-density polyethylene (3.2 mole-percent octene-(1)) | 31 |
| 4a | linear low-density polyethylene (14.2 mole-percent propene-(1)) | 19 |
| 4b | linear low-density polyethylene (8.7 mole-percent butene-(1)) | 21 |
| 4c | linear low-density polyethylene (3.2 mole-percent butene-(1)) | 25 |
| 4d | linear low-density polyethylene (5.6 mole-percent hexene-(1)) | 25 |
| 4e | linear low-density polyethylene (4.2 mole-percent octene-(1)) | 32 |
| 4f | linear low-density polyethylene (1.0 mole-percent octene-(1)) | 37 |
| 4g | linear low-density polyethylene (0.2 mole-percent hexadecene-(1)) | 34 |

TABLE 2

| Example | Composition of the Front-Side Coating | | | | Gel Particle Level (part. per sq. m) | Film Adhesion (Note) |
|---|---|---|---|---|---|---|
|  | Titanium Dioxide | Low-Density Polyethylene (in weight-percent) | High-Density Polyethylene | Linear Low-Density Polyethylene |  |  |
| 1a compar. | 18 | 82 |  | 0 | 12 | 3 |
| 1b | 18 | 74 |  | 8 | 9 | 3 |
| 1c | 18 | 57.5 |  | 24.5 | 6 | 2 |
| 1d | 18 | 24.5 |  | 57.5 | 7 | 1 |
| 2a compar. | 15 | 64 | 21 | 0 | 13 | 3 |

TABLE 2-continued

| Example | Composition of the Front-Side Coating | | | | Gel Particle | |
| --- | --- | --- | --- | --- | --- | --- |
| | Titanium Dioxide | Low-Density Polyethylene | High-Density Polyethylene | Linear Low-Density Polyethylene | Level (part. per sq. m) | Film Adhesion (Note) |
| | | (in weight-percent) | | | | |
| 2b compar. | 24 | 60.4 | 15.6 | 0 | elevation in film not evaluated | |
| 2c | 15 | 43.8 | 16.2 | 25 | 5 | 1 |
| 2d | 24 | 40.4 | 13.2 | 22.4 | 7 | 2 |
| 2e | 33 | 37 | 10.2 | 19.8 | 8 | 2 |
| 2f | 15 | 46.5 | 13.5 | 25 | 9 | 1 |
| 3a compar. | 17.5 | 82 | | 0 | 13 | 4 |
| 3b compar. | 17.5 | 82 | | 0 | 11 | 4 |
| 3c compar. | 17.5 | 82 | | 0 | elevation in film not evaluated | |
| 3d | 17.5 | 64 | | 18 | 6 | 3 |
| 3e | 17.5 | 64 | | 18 | 5 | 4 |
| 3f | 17.5 | 64 | | 18 | 7 | 4 |
| 4a | 20 | 60 | | 20 | 7 | |
| 4b | 20 | 60 | | 20 | 6 | |
| 4c | 20 | 60 | | 20 | 4 | |
| 4d | 20 | 60 | | 20 | 5 | |
| 4e | 20 | 60 | | 20 | 6 | |
| 4f | 20 | 60 | | 20 | 7 | |
| 4g | 20 | 60 | | 20 | 8 | |
| 4h compar. | 20 | 80 | | 0 | 12 | |

The results of the filtratest of the premixtures and of the gel-particle level of the produced coatings illustrate that the mixtures according to the invention, employing the linear low-density polyethylene, have a lower tendency to form pigment agglomerates.

The various examples of Example 2 illustrate that layers with higher pigment levels can be produced with linear low-density polyethylene premixtures than hitherto with pigment-containing low-density polyethylene or high-density polyethylene premixtures. Example 2f illustrates that a lower gel-particle level compared to the comparison example 2a can be achieved even if the linear low-density polyethylene is added directly to the coating mass and not added via a premixture. This improvement is, however, slightly less than in the preferred addition via a premixture.

The examples of Example 3 clearly illustrate that thinner coatings can be extruded from a melt if the melt contains linear low-density polyethylene. This holds even in case of the recited polyolefin resin mixtures containing a relatively high titanium dioxide content.

The examples of Example 4 indicate that the illustrated advantages can be achieved with various types of linear low-density polyethylenes.

The examples 1, 2 and 3 also illustrate that linear low-density polyethylene in the coating mass improves finally even the adhesion of the front-side coating on the paper.

It will be understood that each of the elements described above, or two or more together, may also find a useful application in other types of support materials differing from the types described above.

While the invention has been illustrated and described as embodied in the context of a water-resistant support material for light-sensitive materials, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. The water-resistant support material for a light-sensitive material, comprising
   a flat base material; polyolefin resin coated onto a front side of the base material for forming a coating, where the coating comprises, on the face of the base material to be coated with light-sensitive layers, in addition a light-reflecting white pigment and, wherein the polyolefin resin on the front-side contains a linear low-density polyethylene wherein the linear low-density polyethylene is a copolymer of ethylene and a non-ethylene α-olefin, wherein the light-reflecting white pigment is a titanium, where the content of titanium dioxide in the coating material amounts up to 40% by weight dioxide.

2. The water-resistant support material according to claim 1 further comprising
   polyolefin resin coated onto a back side of the base material for forming a coating, where the coating comprises to at least about 10 weight percent a copolymer of ethylene and non-ethylene α-olefin, a linear low density polyethylene LLDPE.

3. The water-resistant support material according to claim 1, wherein the base material is a paper material.

4. The water-resistant support material according to claim 1, wherein the base material is a film material.

5. The water-resistant support material according to claim 1, wherein the coating mass comprises at least one of the conventional additives selected from the group consisting of matting agents, antistatics, antioxidants, slip additives, lubricants, pigments, coloring agents, optical brighteners, and separating agents or mixtures thereof.

6. The water-resistant support material according to claim 1, wherein the non-ethylene α-olefin in the copolymer comprises $C_3$ to $C_{18}$ carbon atoms.

7. The water-resistant support material according to claim 6, wherein the non-ethylene α-olefin in the copolymer comprises $C_4$ to $C_8$ carbon atoms.

8. The water-resistant support material according to claim 1, wherein the content of non ethylene α-olefin in the copolymer amounts to from about 0.1 to 20 mole-percent.

9. A water-resistant support material for light-sensitive layers comprising
a substrate web of paper or film material and a white pigment containing resin layer extrusion coated onto at least one surface of the substrate web,
wherein the resin layer comprises a copolymer of ethylene and at least one non-ethylene α-olefin and wherein the α-olefin is a compound with $C_3$ to $C_{18}$ carbon atoms and amounts in the copolymer to about 0.1 to 20 mole-percent.

10. A water-resistant support material for light-sensitive layers comprising
a substrate web of paper and polyolefin resin layers extrusion coated onto both surfaces of the paper web,
wherein at least the layer on the face side of the substrate web to be coated with light-sensitive layers comprises a light-reflecting white pigment and a copolymer of ethylene and at least one non-ethylene α-olefin and wherein the α-olefin is selected from the compounds containing $C_3$ to $C_{18}$ carbon atoms and amounts in the copolymer to about 0.1 to 20 mole-percent.

* * * * *